US010408319B2

United States Patent
Sugimoto et al.

(10) Patent No.: US 10,408,319 B2
(45) Date of Patent: Sep. 10, 2019

(54) MICRO-TRACTION DRIVE UNIT, HYDRAULIC TRANSMISSION AND HYDRAULIC DEVICE

(71) Applicant: Kanzaki Kokyukoki Mfg. Co., Ltd., Amagasaki-shi, Hyogo (JP)

(72) Inventors: Hiroshi Sugimoto, Amagasaki (JP); Hajimu Imanaka, Amagasaki (JP); Hiroaki Hashima, Amagasaki (JP)

(73) Assignee: Kanzaki Kokyukoki Mfg. Co., Ltd., Amagasaki-shi, Hyogo (JP)

( * ) Notice: Subject to any disclaimer, the term of this patent is extended or adjusted under 35 U.S.C. 154(b) by 355 days.

(21) Appl. No.: 15/274,995

(22) Filed: Sep. 23, 2016

(65) Prior Publication Data

US 2017/0152929 A1    Jun. 1, 2017

(30) Foreign Application Priority Data

Dec. 1, 2015 (JP) ................................. 2015-234710

(51) Int. Cl.
*F16H 13/08* (2006.01)
*F16H 39/14* (2006.01)
(Continued)

(52) U.S. Cl.
CPC .............. *F16H 39/14* (2013.01); *F16H 13/10* (2013.01); *F16H 47/04* (2013.01); *F16H 61/42* (2013.01); *F16H 61/431* (2013.01); *F16H 13/08* (2013.01)

(58) Field of Classification Search
CPC .......... F16H 13/08; F16H 13/10; F16H 13/06; F16H 47/02; F16H 47/04
(Continued)

(56) References Cited

U.S. PATENT DOCUMENTS

| 1,201,367 | A | | 10/1916 | Shelton |
| 2,536,803 | A | * | 1/1951 | Gleason ................. F16H 13/08 475/187 |

(Continued)

FOREIGN PATENT DOCUMENTS

| JP | 58-046252 | 3/1983 |
| JP | 3659925 B2 | 3/2005 |
| JP | 2006234079 A | 9/2006 |

OTHER PUBLICATIONS

Extended European Search Report issued in European Patent Application No. 16191083.1, dated May 31, 2017.

*Primary Examiner* — Thomas E Lazo
*Assistant Examiner* — Dustin T Nguyen
(74) *Attorney, Agent, or Firm* — Sterne, Kessler, Goldstein & Fox P.L.L.C.

(57) ABSTRACT

A MTD unit according to a present disclosure includes a bearing member that has an inner ring, a plurality of rolling elements and an outer ring and is capable of bearing a radial load and a unidirectional axial load, a retainer that has a retaining part retaining the rolling elements such that the rolling elements are rotatable around their own axes and rotates around an axis of the inner ring in accordance with an orbital motion of the rolling elements around the inner ring, and a case that accommodates the bearing member and the retainer, wherein the case has a piston that is axially movable so as to push a movable body, which is either the inner ring or the outer ring, in a first axial direction, an oil chamber provided on an opposite side of the piston from the movable body, and an oil passage for guiding pressurized oil to the oil chamber.

5 Claims, 9 Drawing Sheets

(51) Int. Cl.
  *F16H 61/42*    (2010.01)
  *F16H 13/10*    (2006.01)
  *F16H 61/431*   (2010.01)
  *F16H 47/04*    (2006.01)

(58) Field of Classification Search
  USPC .................................................. 475/189, 196
  See application file for complete search history.

(56) References Cited

U.S. PATENT DOCUMENTS

| | | | | |
|---|---|---|---|---|
| 2,874,592 | A * | 2/1959 | Oehrli | F01P 7/046 |
| | | | | 475/115 |
| 2,905,026 | A * | 9/1959 | Ochrli | F01P 7/04 |
| | | | | 415/26 |
| 3,793,907 | A * | 2/1974 | Nakamura | F16H 15/50 |
| | | | | 475/114 |
| 4,617,838 | A | 10/1986 | Anderson | |
| 4,667,525 | A * | 5/1987 | Schottler | F16H 15/503 |
| | | | | 475/115 |
| 7,082,759 | B1 * | 8/2006 | Tsukamoto | A01D 69/03 |
| | | | | 60/456 |
| 2008/0210482 | A1 * | 9/2008 | Ishii | A01D 69/03 |
| | | | | 180/242 |

* cited by examiner

MICRO-TRACTION DRIVE UNIT, HYDRAULIC TRANSMISSION AND HYDRAULIC DEVICE

BACKGROUND

Field

The present disclosure relates to a micro-traction drive unit as well as a hydrostatic transmission (HST) and a hydraulic device including a micro-traction drive mechanism.

Related Art

For example, JP S58-046252A and JP 3659925B (which will be referred to as Patent Documents 1 and 2, respectively, below) propose micro-traction drive devices comprising a bearing member, such as an angular contact ball bearing or a conical roller bearing, that has an inner ring, a plurality of rolling elements, and an outer ring and is capable of bearing a radial load and a unidirectional axial load, and a retainer that has a retaining part retaining the rolling elements such that the rolling elements are rotatable around their own axes and rotates around the axis of the inner ring in accordance with the orbital motion of the rolling elements around the inner ring.

Such a micro-traction drive device can be utilized as a decelerator when the inner ring is used as an input member and the retainer is used as an output member, and can be utilized as an accelerator when the retainer is used as an input member and the inner ring is used as an output member.

Meanwhile, in order to cause the micro-traction drive device to properly operate as a decelerator or an accelerator, it is necessary to apply a suitable normal force to the bearing member.

The normal force can be obtained, for example, by:

(1) setting the outer diameter of the outer ring and the inner diameter of the inner circumferential surface of a case accommodating the outer ring at such sizes that the outer ring is provided in a state of being compressed in the radially inward direction, (2) setting the inner diameter of the inner ring and the outer diameter of a power transmission shaft around which the inner ring is disposed in a relatively non-rotatable manner at such sizes that the inner ring is supported in a state of being expanded in the radially outward direction, and/or (3) configuring one of the outer ring and the inner ring to be movable in a first axial direction and the other to be immovable in the first axial direction and applying an axial load to one of the outer ring and the inner ring by a coil spring (see Patent Documents 1 and 2).

However, with configurations (1) and (2), the magnitude of the normal force applied is determined by the amount of compression of the outer ring and the amount of expansion of the inner ring resulting from the dimensional tolerance, and it is thus difficult to adjust the normal force.

Moreover, in configurations (1) and (2), the outer ring and the inner ring are deformed in the radial direction, and thus the service life may be shortened.

On the other hand, configuration (3) does not suffer the problems encountered with configurations (1) and (2), but the biasing force of the coil spring has to be altered to adjust the normal force, and it cannot be said that the adjustment for obtaining a suitable normal force is easy.

Moreover, since an axial load is applied by the coil spring to the end face of the outer ring (or the inner ring) facing in the axial direction, configuration (3) may be problematic in that uniformly applying an axial load to the entirety of the end face of the outer ring (or the inner ring) is difficult.

SUMMARY

The present disclosure has been conceived in view of the conventional art described above, and a first object of the present disclosure is to provide a micro-traction drive (MTD) unit including an MTD mechanism which includes a bearing member that has an inner ring, a plurality of rolling elements, and an outer ring and is capable of bearing a radial load and a unidirectional axial load and a retainer that has a retaining part retaining the rolling elements such that the rolling elements are rotatable around their own axes and rotates around the axis of the inner ring in accordance with the orbital motion of the rolling elements around the inner ring, in which the bearing member exerts a normal force as a result of an axial load applied to one of the inner ring and the outer ring serving as a movable body, and with which the amount of axial load applied to the movable body can be easily adjusted, and the axial load can be uniformly applied to the entirety of the end face in the axial direction of the movable body.

Moreover, a second object of the present disclosure is to provide a hydrostatic transmission and a hydraulic device including an MTD mechanism with which the amount of axial load applied to the movable body can be easily adjusted, and the axial load can be uniformly applied to the entirety of the end face in the axial direction of the movable body.

In order to achieve the first object, the present disclosure provides a micro-traction drive unit including a bearing member that has an inner ring, a plurality of rolling elements, and an outer ring and is capable of bearing a radial load and a unidirectional axial load, a retainer that has a retaining part retaining the rolling elements such that the rolling elements are rotatable around their own axes and rotates around an axis of the inner ring in accordance with an orbital motion of the rolling elements around the inner ring, and an MTD case that accommodates the bearing member and the retainer, the inner ring and the retainer both being connectable to a corresponding external rotational member, wherein the bearing member is accommodated in the MTD case such that, with the outer ring being radially immovable, one of the inner ring and the outer ring is a movable body that is movable in a first axial direction to exert a radial load on the rolling elements, and the other is a fixed body that is immovable in the first axial direction, and the MTD case has a piston that is axially movable so as to be capable of pushing the movable body in the first axial direction, an oil chamber provided on an opposite side of the piston from the movable body, and an oil passage for guiding pressurized oil to the oil chamber all the time.

In some embodiments, the MTD unit is configured so that the piston that is pushed in the axial direction by pressurized oil supplied to the oil chamber applies an axial load to the movable body, which is either the inner ring or the outer ring and exerts a normal force as a result of an axial load applied to the movable body, the inner ring and the outer ring being components of the bearing member capable of bearing a radial load and a unidirectional axial load. The thus configured MTD unit makes it possible to easily adjust the amount of axial load applied to the movable body, and uniformly apply the axial load to the entirety of the end face of the movable body that receives the axial load.

Accordingly, the MTD unit can realize a desired speed-increased power transmission state or speed-decreased power transmission state without suffering a forced operating condition, and extend the service life of the bearing member and the retainer.

In some embodiments, the MTD unit preferably includes an auxiliary spring that is arranged in the oil chamber so as to bias the piston in the first axial direction.

In order to achieve the second object, the present disclosure provides a hydrostatic transmission (HST) including a pump shaft operatively connected to a driving source, a motor shaft acting as an output shaft, a hydraulic pump and a hydraulic motor that are supported by the pump shaft and the motor shaft, respectively, and are fluidly connected to each other, a case accommodating the hydraulic pump and the hydraulic motor, and a volume varying member varying a volume of at least one of the hydraulic pump and the hydraulic motor, wherein the hydrostatic transmission further includes a bearing member that has an inner ring, a plurality of rolling elements, and an outer ring and is capable of bearing a radial load and a unidirectional axial load, and a retainer that has a retaining part retaining the rolling elements such that the rolling elements are rotatable around their own axes and rotates around an axis of the inner ring in accordance with an orbital motion of the rolling elements around the inner ring, the bearing member is accommodated in the case such that, with the inner ring being connected to one of the pump shaft and the motor shaft so as to be relatively non-rotatable and the outer ring being radially immovable, one of the inner ring and the outer ring is a movable body that is movable in a first axial direction to exert a radial load on the rolling elements, and the other is a fixed body that is immovable in the first axial direction, and the case has a piston that is axially movable so as to be capable of pushing the movable body in the first axial direction, an oil chamber provided on an opposite side of the piston from the movable body, and an oil passage that forms at least a part of a preload line for supplying some of pressurized oil present in the hydrostatic transmission to the oil chamber.

In some embodiments, the HST is configured so that the piston that is pushed in the axial direction by some of the pressurized oil in the HST supplied to the oil chamber applies an axial load to the movable body, which is either the inner ring or the outer ring and exerts a normal force as a result of an axial load applied to the movable body, the inner ring and the outer ring are components of the bearing member capable of bearing a radial load and a unidirectional axial load. The thus configured HST makes it possible to easily adjust the amount of axial load applied to the movable body, and uniformly apply the axial load the entirety of the end face of the movable body that receives the axial load.

Accordingly, the HST can realize a desired speed-increased power transmission state without suffering a forced operating condition in a case where the inner ring is supported by the pump shaft, and also realize a desired speed-decreased power transmission state without suffering a forced operating condition in a case where the inner ring is supported by the motor shaft. Therefore, the HST can extend the service life of the bearing member and the retainer.

In some embodiments of the HST, the hydraulic pump and the hydraulic motor are fluidly connected to each other by a pair of first and second hydraulic oil lines so as to form a closed circuit, the volume varying member is configured to be capable of reaching a normal-rotation operating state in which supply and discharge directions of the hydraulic pump are determined such that the first and second hydraulic oil lines have a high pressure and a low pressure, respectively, so as to cause the hydraulic motor to perform normal rotation, and a reverse-rotation operating state in which supply and discharge directions of the hydraulic pump are determined such that the first and second hydraulic oil lines have a low pressure and a high pressure, respectively, so as to cause the hydraulic motor to perform reverse rotation.

The preload line includes first and second preload lines fluidly connected to the first and second hydraulic oil lines, respectively, an oil-chamber-side preload line fluidly connected to the oil chamber, and a switching valve interposed between the oil-chamber-side preload line and the first and second preload lines.

The switching valve is capable of reaching a normal-rotation position where the first preload line is connected to the oil-chamber-side preload line and the second preload line is disconnected from the oil-chamber-side preload line, and a reverse-rotation position where the first preload line is disconnected from the oil-chamber-side preload line and the second preload line is connected to the oil-chamber-side pre-load line, and the switching valve reaches the normal-rotation position and the reverse-rotation position when the volume varying member is in the normal-rotation operating state and the reverse-rotation operating state, respectively.

In some embodiments, the switching valve is preferably capable of reaching, in addition to the normal-rotation position and the reverse-rotation position, a neutral position where the first and second preload lines are both disconnected from the oil-chamber-side preload line.

In this case, the switching valve is configured to reach the neutral position when the volume varying member is in a neutral state between the normal-rotation operating state and the reverse-rotation operating state.

In some embodiments of the HST, the hydraulic pump and the hydraulic motor are fluidly connected to each other by a pair of first and second hydraulic oil lines so as to form a closed circuit, and the volume varying member is configured to be capable of reaching a normal-rotation operating state in which supply and discharge directions of the hydraulic pump are determined such that the first hydraulic oil line has a high pressure so as to cause the hydraulic motor to perform normal rotation, and a neutral state in which supply and discharge of the hydraulic pump are suspended.

In this case, the preload line has one end that is fluidly connected to the first hydraulic oil line and the other end that is fluidly connected to the oil chamber, and a switching valve is disposed in the preload line.

The switching valve is capable of reaching a normal-rotation position where the preload line is in a communicating state, and a neutral position where the preload line is in an interrupted state, and the switching valve reaches the normal-rotation position and the neutral position when the volume varying member is in a normal-rotation operating state and a neutral state, respectively.

In some embodiments, the HST further includes a charge pump that is operatively driven by the driving source, and a charge line that supplies pressurized oil discharged by the charge pump to a pair of first and second hydraulic oil lines that fluidly connect the hydraulic pump and the hydraulic motor.

In this case, the preload line is configured to supply some of the pressurized oil present in the charge line rather than the hydraulic line to the oil chamber.

In some embodiments, the HST preferably includes an auxiliary spring that is provided in the oil chamber so as to bias the piston in the first axial direction.

In order to achieve the second object, the present disclosure also provides a hydraulic device including a rotational shaft, a rotating component supported by the rotational shaft, a bearing member that has an inner ring, a plurality of rolling elements, and an outer ring and is capable of bearing a radial load and a unidirectional axial load, a retainer that has a retaining part retaining the rolling elements such that the rolling elements are rotatable around their own axes and rotates around an axis of the inner ring in accordance with an orbital motion of the rolling elements around the inner ring, and a case that accommodates the rotating component, the bearing member, and the retainer, wherein the bearing member is accommodated in the case such that, with the outer ring being radially immovable, one of the inner ring and the outer ring is a movable body that is movable in a first axial direction to exert a radial load on the rolling elements, and the other is a fixed body that is immovable in the first axial direction, and the case has a piston that is axially movable so as to be capable of pushing the movable body in the first axial direction, an oil chamber provided on an opposite side of the piston from the movable body, and an oil passage that forms at least a part of a preload line for supplying pressurized oil to the oil chamber.

In some embodiments, the hydraulic device is configured so that the piston that is pushed in the axial direction by pressurized oil supplied to the oil chamber applies an axial load to the movable body, which is either the inner ring or the outer ring and exerts a normal force as a result of an axial load applied to the movable body, the inner ring and the outer ring are components of the bearing member capable of bearing a radial load and a unidirectional axial load. The thus configured hydraulic device makes it possible to easily adjust the amount of axial load applied to the movable body, and uniformly apply the axial load the entirety of the end face of the movable body that receives the axial load.

Accordingly, the hydraulic device can realize a desired speed-increased power transmission state or speed-decreased power transmission state without suffering a forced operating condition, and extend the service life of the bearing member and the retainer.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

First Embodiment

Below, one embodiment of the hydrostatic transmission (HST) according to the present disclosure will now be described with reference to the attached drawings.

Figure 1:
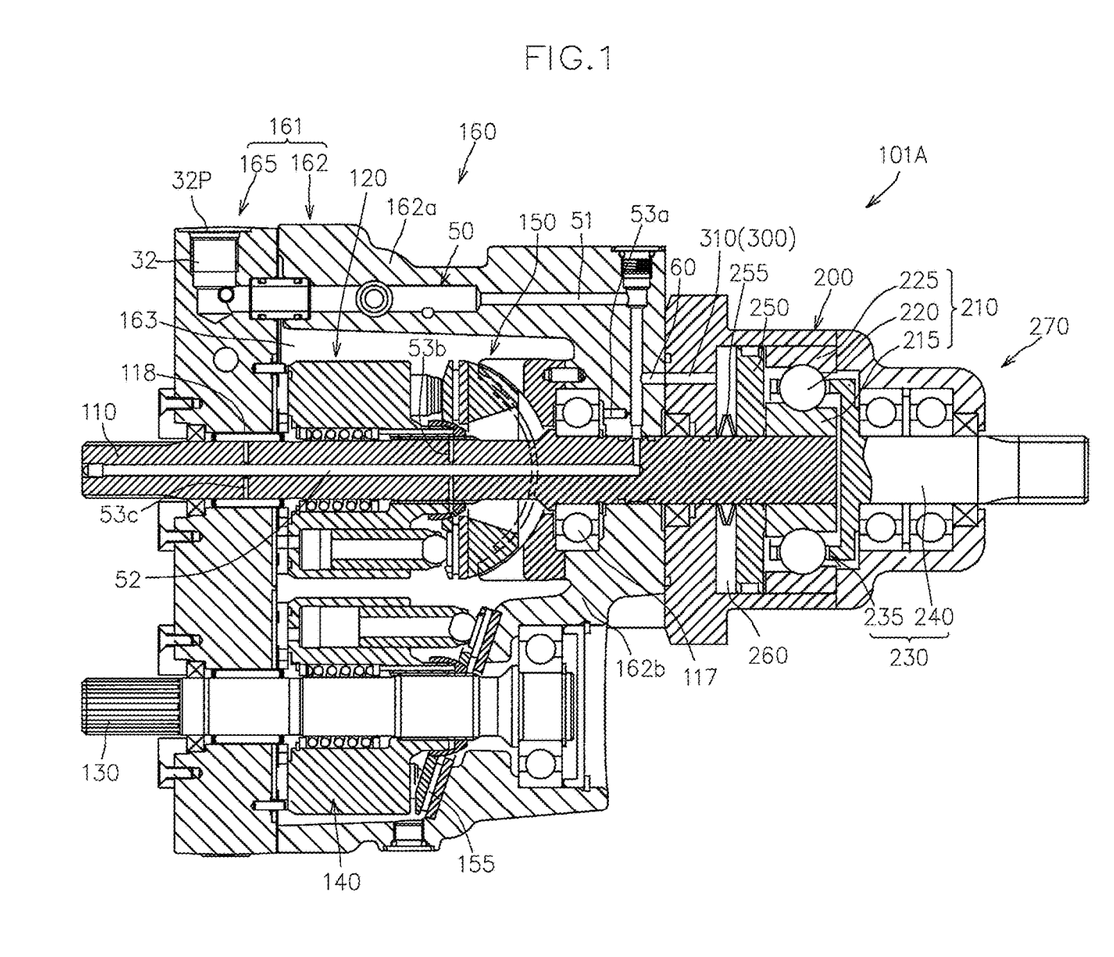
FIG. 1 is a cross-sectional view of an HST according to a first embodiment of the present disclosure.
Figure 2:
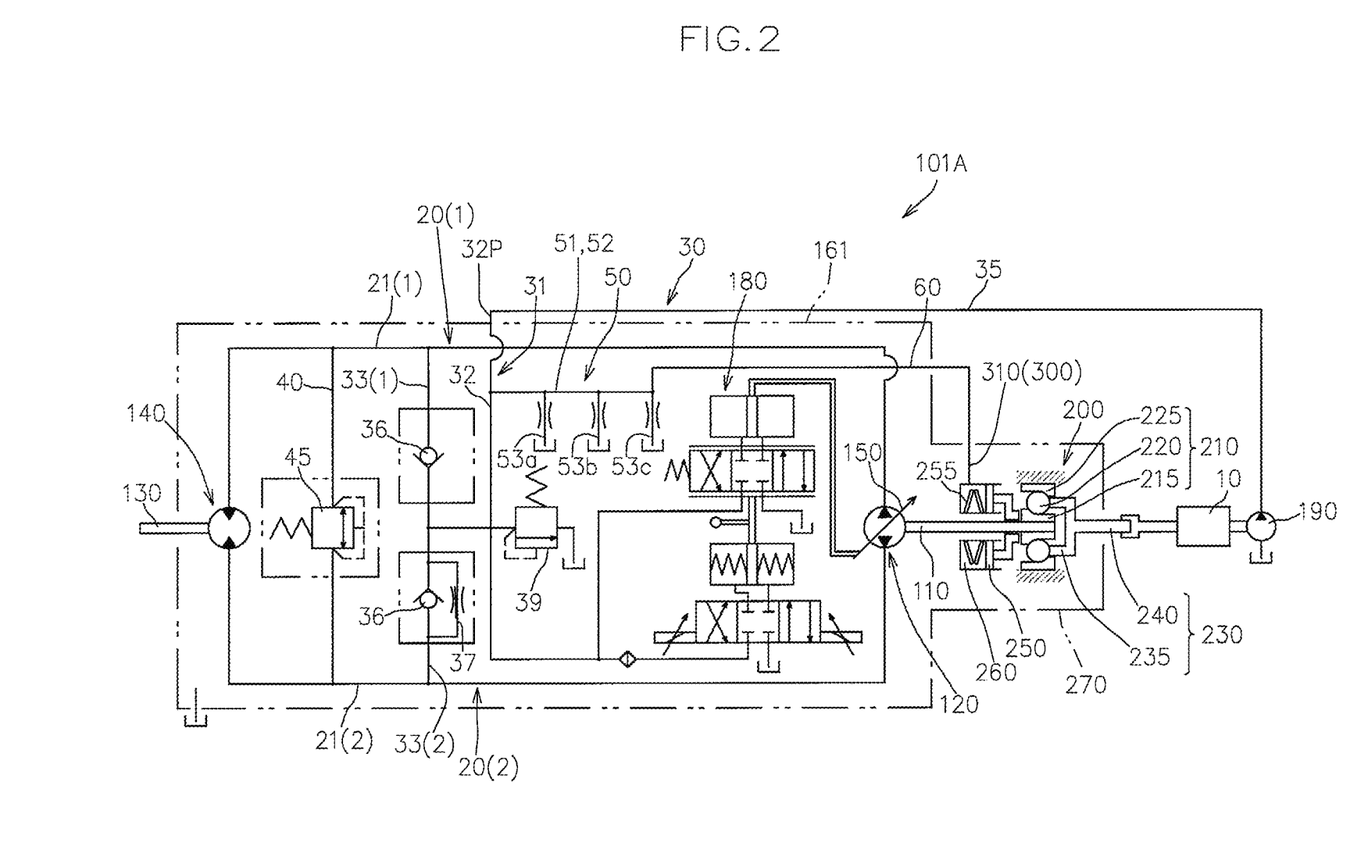
FIG. 2 is a hydraulic circuit diagram of the HST illustrated in FIG. 1.

FIGS. 1 and 2 show a cross-sectional view and a hydraulic circuit diagram of an HST 101A according to this embodiment, respectively.

As shown in FIGS. 1 and 2, the HST 101A includes a pump shaft 110 operatively connected to a driving source 10, a motor shaft 130 acting as an output shaft, a hydraulic pump 120 and a hydraulic motor 140 that are supported by the pump shaft 110 and the motor shaft 130, respectively, and are fluidly connected to each other via a pair of first and second hydraulic oil lines 20(1), 20 (2), a case 160 accommodating the hydraulic pump 120 and the hydraulic motor 140, and a volume varying member 150 varying the volume of at least one of the hydraulic pump 120 and the hydraulic motor 140.

In the present embodiment, as shown in FIGS. 1 and 2, the volume varying member 150 has a pump-side movable swash plate that varies the volume of the hydraulic pump 120.

In the first embodiment, in the HST 101A, the volume of the hydraulic motor 140 is fixed.

In the first embodiment, the HST 101A has a motor-side fixed swash plate 155 that defines the volume of the hydraulic motor 140.

In the first embodiment, the case 160 has an HST case 161 that accommodates the hydraulic pump 120 and the hydraulic motor 140 in an integral manner.

In the first embodiment, the HST case 161 has first and second hydraulic oil passages 21(1), 21(2) that form the first and second hydraulic oil lines 20(1), 20(2), respectively, and a charge oil passage 31 that forms a part of a charge line 30 for supplying pressurized oil to the first and second hydraulic oil lines 20(1), 20(2).

As shown in FIG. 1, the HST case 161 has an HST case body 162 that has an opening 163 into which the hydraulic pump 120 and the hydraulic motor 140 can be inserted and a port block 165 that is removably attached to the HST case body 162 so as to block the opening 163. The first and second hydraulic oil passages 21(1), 21(2) are formed in the port block 165.

As shown in FIG. 1, the HST case body 162 has a peripheral wall 162a that surrounds the hydraulic pump 120 and the hydraulic motor 140, and an end wall 162b that blocks one side in the axial direction of the peripheral wall 162a. The other side in the axial direction of the peripheral wall 162a defines the opening 163.

In the first embodiment, as shown in FIG. 2, a charge pump 190 that serves as the oil source of the charge line 30 is placed away from the HST case 161, and pressurized oil from the charge pump 190 is supplied to the charge oil passage 31 via a charge conduit 35.

Specifically, the charge oil passage 31 has a main charge oil passage 32, one end of which opens to the outer surface of the HST case 161 (the port block 165 in the illustrated embodiment) to form a charge port 32P, and first and second charge oil passages 33(1), 33(2), the first ends of which are fluidly connected to the main charge oil passage 32 and the second ends of which are fluidly connected to the first and second hydraulic oil passages 21(1), 21(2), respectively.

In this configuration, the charge conduit 35 is connected to the charge port 32P.

Moreover, as shown in FIG. 2, the pressure of the main charge oil passage 32 is adjusted by a charge relief valve 39.

In the first embodiment, in each of the first and second charge oil passages 33(1), 33(2), a check valve 36 is disposed that allows the flow of oil from the main charge oil passage 32 to the corresponding hydraulic oil passages 21(1), 21(2) and prevents flow in the opposite direction.

One of the first and second charge oil passages 33(1), 33(2) (for example, an oil passage that becomes a high-pressure side when the hydraulic motor 140 is driven in a reverse direction) has a restrictor-equipped bypass oil passage 37 for bypassing the check valve 36, and thereby the neutral zone of the HST 101A is ensured.

In the first embodiment, as shown in FIG. 2, the HST 101A has a communication oil passage 40 that includes a high-pressure relief valve 45 for causing, when the pressure of one of the first and second hydraulic oil passages 21(1), 21(2) becomes excessive, pressurized oil of said one oil passage to flow into the other oil passage.

In the first embodiment, the HST 101A is configured to be capable of drawing some of the charge oil that has been pressure-adjusted by the charge relief valve 35.

Specifically, as shown in FIGS. 1 and 2, the HST 101A has a drawing oil passage 50 for drawing some of the pressurized oil that has been pressure-adjusted by the charge relief valve 35.

In the first embodiment, as shown in FIG. 1, the drawing oil passage 50 has a case-side drawing oil passage 51 that is formed in the port block 165 and the HST case body 162 such that one end of which is fluidly connected to the main charge oil passage 32 and the other end of which opens to a rotary joint between the pump shaft 110 and the HST case body 162, and a pump-shaft-side drawing oil passage 52, one end of which is fluidly connected to the case-side drawing oil passage 51 via the rotary joint.

The pressurized oil drawn through the drawing oil passage 50 is usable for various applications.

In the first embodiment, the pressurized oil drawn through the drawing oil passage 50 is utilized as lubricating oil.

In the first embodiment, the HST 101A has a lubricating oil passage 53 that guides lubricating oil from the case-side drawing oil passage 51 or the pump-shaft-side drawing oil passage 52 to predetermined lubrication sites.

In the first embodiment, as shown in FIGS. 1 and 2, the lubricating oil passage 53 has a first lubricating oil passage 53a that guides lubricating oil from the case-side drawing oil passage 51 toward a ball bearing 117 provided in the end wall 162b to support the pump shaft 110 in a rotatable manner around the axis, a second lubricating oil passage 53b that guides lubricating oil from the pump-shaft-side drawing oil passage 52 toward the contact surface between the piston of the hydraulic pump 120 and the pump-side movable swash plate, and a third lubricating oil passage 53c that guides lubricating oil from the pump-shaft-side drawing oil passage 52 toward a needle bearing 118 provided in the port block 165 to support the pump shaft 110 in a rotatable manner around the axis.

In the first embodiment, as shown in FIG. 2, the HST 101A further has a hydraulic servomechanism 180 that produces an operating force for tilting the pump-side movable swash plate, and hydraulic oil for the hydraulic servomechanism 180 is also drawn from the main charge oil passage 32.

The HST 101A of this embodiment further has a microtraction drive (MTD) mechanism 200.

As shown in FIGS. 1 and 2, the MTD mechanism 200 includes a bearing member 210 that has an inner ring 215, a plurality of rolling elements 220, and an outer ring 225 and is capable of bearing a radial load and a unidirectional axial load, and a retainer 230 that has a retaining part 235 retaining the rolling elements 220 so as to be rotatable around their own axes and rotates around the axis of the inner ring 215 in accordance with the orbital motion of the rolling elements 220 around the inner ring 215.

An angular contact ball bearing or a conical roller bearing can be used as the bearing member 210.

In the first embodiment, as shown in FIGS. 1 and 2, an angular contact ball bearing is used as the bearing member 210.

In the first embodiment, as shown in FIG. 1, the MTD mechanism 200 is accommodated in an MTD case 270 that is removably attached to the HST case 161, and the MTD mechanism 200 and the MTD case 270 form an MTD unit that is removably attached to the HST case 161.

The MTD mechanism 200 is configured to obtain a normal force necessary for power transmission by receiving an axial load at one of the inner ring 215 and the outer ring 225.

Specifically, the bearing member 210 is accommodated in the MTD case 270 such that, with the outer ring 225 being radially immovable, one of the inner ring 215 and the outer ring 225 is a movable body that is movable in a first axial direction to exert a radial load on the rolling elements 220, and the other of the inner ring 215 and the outer ring 225 is a fixed body that is immovable in the first axial direction.

In the first embodiment, as shown in FIG. 1, the inner ring 215 forms a movable body that is movable in the first axial direction (rightward in FIG. 1), and the outer ring 225 forms a fixed body that is immovable in the first axial direction.

The retainer 230 has, in addition to the retaining part 235, a shaft part 240 that is placed coaxially with the inner ring 215 and rotates around the axis together with the retaining part 235, and the retainer 230 is supported by the MTD case 270 via bearing members so as to be rotatable around the axis, with one end of the shaft part 240 extending outward.

In the first embodiment, the MTD mechanism 200 acts as an accelerator that accelerates rotative power operatively transmitted from the driving source 10 and transmits the resulting rotative power to the pump shaft 110.

In the first embodiment, the MTD mechanism 200 receives, at the shaft part 240 of the retainer 230, a rotative power from the driving source 10, accelerates the rotative power, and transmits the accelerated rotative power to the pump shaft 110 from the inner ring 215.

In addition, the MTD mechanism 200 is also usable as a decelerator that decelerates rotative power output by the motor shaft 130.

Figure 3:
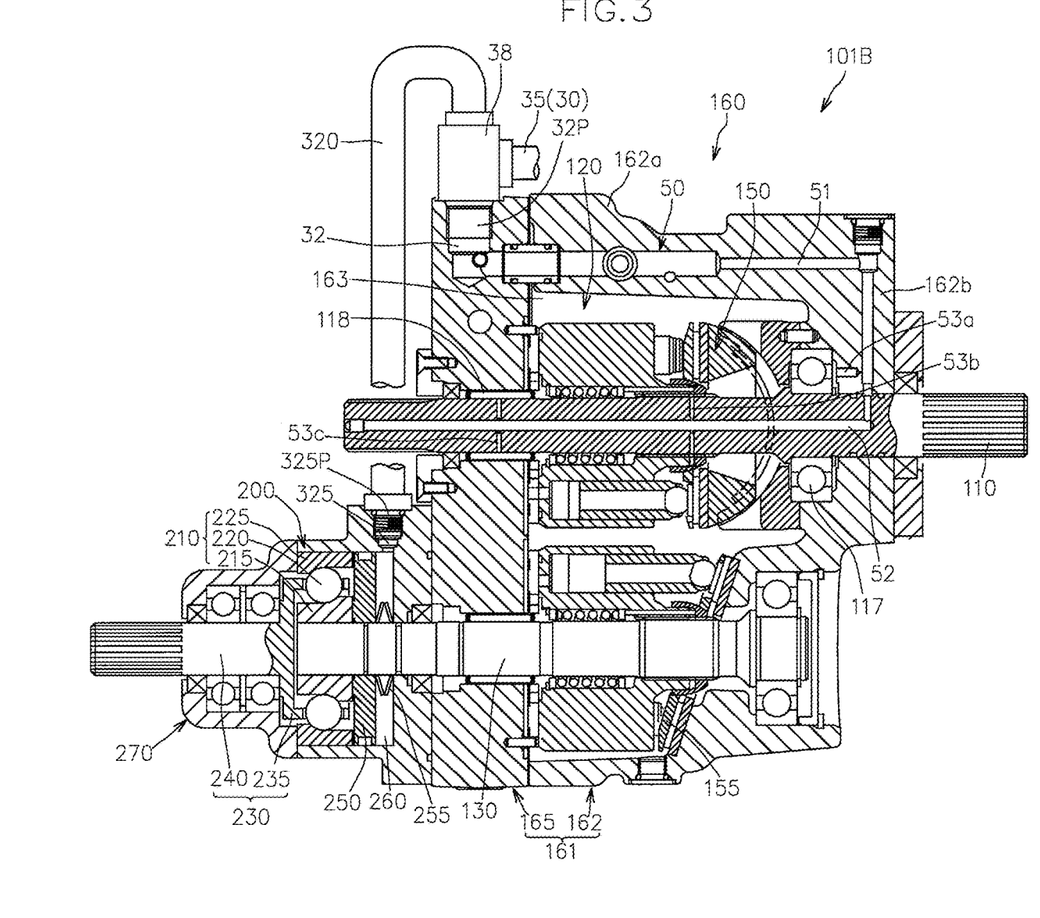
FIG. 3 is a cross-sectional view of an HST according to a modification of the first embodiment.

FIG. 3 shows a cross-sectional view of an HST 101B according to a modification including the MTD mechanism 200 as a decelerator.

In the modification shown in FIG. 3, the inner ring 215 is connected to the motor shaft 130 in a relatively non-rotatable manner around the axis, rotative power input into the inner ring 215 from the motor shaft 130 is decelerated, and the decelerated rotative power is output from the shaft part 240 of the retainer 230.

The MTD mechanism 200 further has a piston 250 that is accommodated in an axially movable manner in a receptacle (the MTD case 270 in this embodiment) accommodating the bearing member 210 and the retainer 230 such that the movable body (the inner ring 215 in this embodiment) can be pushed in the first axial direction and an oil chamber 260 provided in the receptacle so as to be positioned on the opposite side of the piston 250 from the movable body. Pressurized oil can be supplied to the oil chamber 260 via a preload line 300.

As described above, in the first embodiment, the MTD case 270 that is a component separate from the HST case 161 and is removably attached to the HST case 161 acts as the receptacle accommodating the MTD mechanism 200.

In this case, the preload line 300 has an oil passage 310 that is formed in the MTD case 270 such that one end opens to the contact surface in contact with the HST case 161 and the other end opens to the oil chamber 260.

On the other hand, the HST case 161 has an intermediate oil passage 60 that has one end fluidly connected to the main charge oil passage 32 or the drawing oil passage 50 and the other end opened to the contact surface in contact with the MTD case 270 so as to be fluidly connected to one end of the oil passage 310. Some of the oil in the main charge oil passage 32 flows into the oil passage 310 via the intermediate oil passage 60.

In the modification 101B shown in FIG. 3, the preload line 300 has a preload conduit 320, the upstream end of which is fluidly connected to the charge line 30, and an oil passage 325 that is formed in the MTD case 270 such that the upstream end opens to the outside surface to form a preload port 325P, and the downstream end is fluidly connected to the oil chamber 260. The downstream end of the preload conduit 320 is connected to the preload port 325P.

In the configuration shown in FIG. 3, a first connecting end of a three-way joint 38 is connected to the charge port 32P, the downstream end of the charge conduit 35 is connected to a second connecting end of the three-way joint 38, and the upstream end of the preload conduit 320 is connected to a third connecting end.

In the first embodiment, the piston 250 that is pushed by pressurized oil supplied to the oil chamber 260 applies an axial load to the movable body, and therefore the amount of the axial load can be easily adjusted by changing the oil pressure of pressurized oil supplied to the oil chamber 260.

Accordingly, a favorable speed-increased power transmission state or speed-decreased power transmission state by the MTD mechanism 200 can be achieved.

Moreover, the above configuration makes it possible to uniformly apply the axial load to the entirety of the end face in the axial direction of the movable body, and thereby the service life of the MTD mechanism 200 can be extended.

Preferably, as shown in FIGS. 1 to 3, the oil chamber 260 of the MTD mechanism 200 can have an auxiliary spring 255 that biases the piston 250 in the first axial direction.

By proving the auxiliary spring 255, a necessary axial load can be obtained without excessively increasing the oil pressure of the oil chamber 260.

Second Embodiment

Below, another embodiment of the HST of the present disclosure will now be described with reference to attached drawings.

Figure 4:
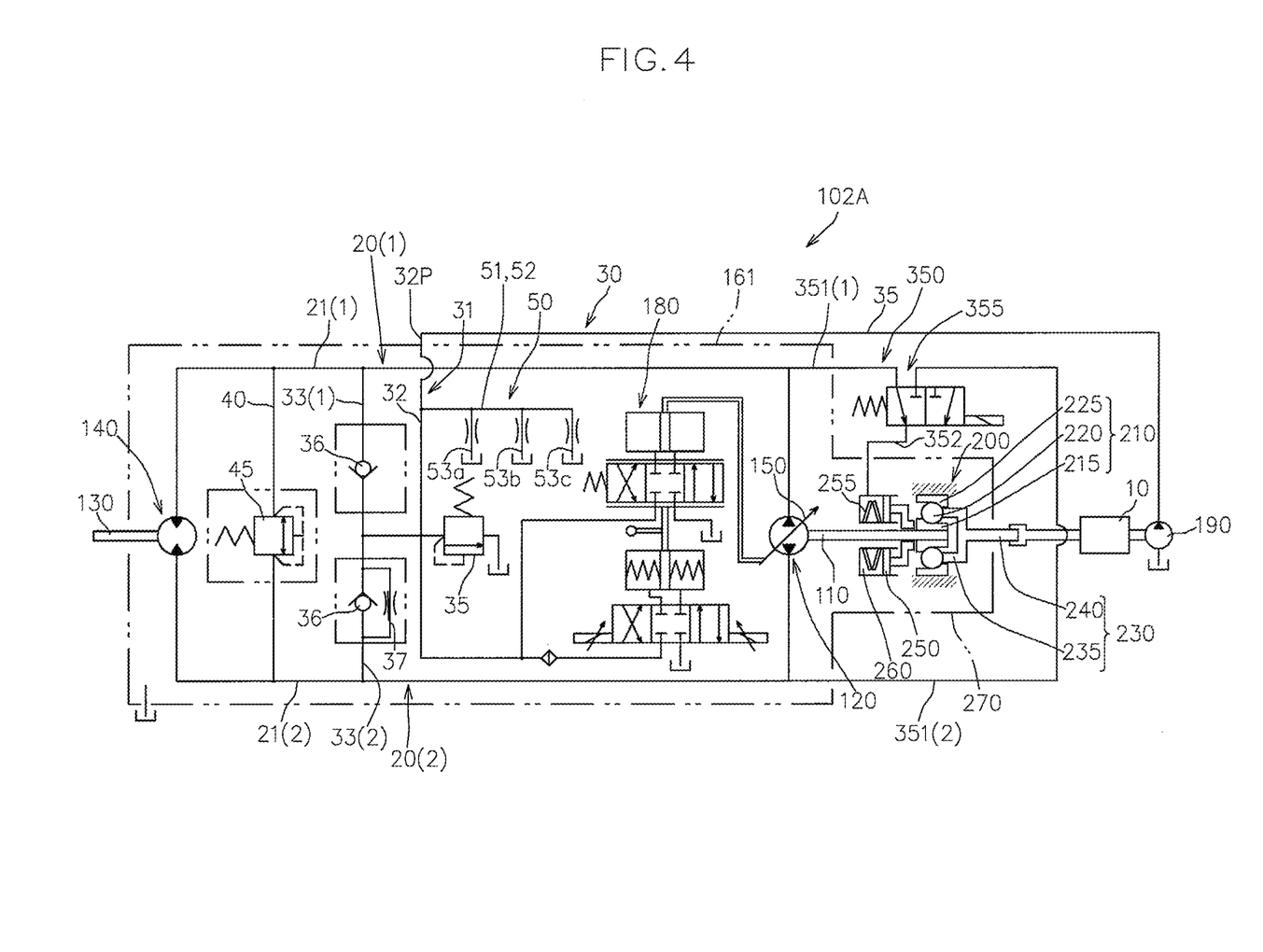
FIG. 4 is a hydraulic circuit diagram of an HST according to a second embodiment.

FIG. 4 shows the hydraulic circuit diagram of an HST 102A according to this embodiment.

In FIG. 4, the same components as those in the first embodiment are given the same reference numbers, and descriptions thereof are omitted as appropriate.

The HST 102A according to this embodiment is different from the HST 101A according to the first embodiment in that the pressurized-oil source for the oil chamber 260 in the MTD mechanism 200 is changed to the hydraulic oil of the HST 102A.

Specifically, the HST 102A according to this embodiment has a preload line 350 in place of the preload line 300 in the HST 101A according to the first embodiment.

Specifically, the pump-side movable swash plate is configured to be capable of reaching a normal-rotation operating state in which the hydraulic motor 140 is rotated in the normal rotational direction and a reverse-rotation operating state in which the hydraulic motor 140 is rotated in the reversed rotational direction.

When the pump-side movable swash plate is in a normal-rotation operating state, the hydraulic pump 120 sucks oil from the second hydraulic oil line 20(2) and discharges pressurized oil to the first hydraulic oil line 20(1).

Accordingly, the first hydraulic oil line 20(1) has a high pressure, and the second hydraulic oil line 20(2) has a low pressure.

On the other hand, when the pump-side movable swash plate is in a reverse-rotation operating state, the hydraulic pump 120 sucks oil from the first hydraulic oil line 20(1) and discharges pressurized oil to the second hydraulic oil line 20(2).

Accordingly, the first hydraulic oil line 20(1) has a low pressure, and the second hydraulic oil line 20(2) has a high pressure.

In this configuration, as shown in FIG. 4, the preload line 350 has first and second preload lines 351(1), 351(2) that are fluidly connected to the first and second hydraulic oil lines 20(1), 20(2), respectively, an oil-chamber-side preload line 352 that is fluidly connected to the oil chamber 260, and a switching valve 355 that is interposed between the oil-chamber-side preload line 352 and the first and second preload lines 351(1), 351(2).

The switching valve 355 is configured to be capable of reaching a normal-rotation position (the position shown in FIG. 4) where the first preload line 351(1) is connected to the oil-chamber-side preload line 352, and the second preload line 351(2) is disconnected from the oil-chamber-side preload line 352, and a reverse-rotation position where the first preload line 351(1) is disconnected from the oil-chamber-side preload line 352, and the second preload line 351(2) is connected to the oil-chamber-side preload line 352.

The switching valve 355 is a solenoid valve, the operation of which is controlled by a controller, and the controller is configured to control the operation of the switching valve 355 such that the switching valve 355 is in a normal-rotation position when the volume varying member 150 is in a normal-rotation operating state, and the switching valve 355 is in a reverse-rotation position when the volume varying member 150 is in a reverse-rotation operating state.

Whether the volume varying member 150 (the pump-side movable swash plate in this embodiment) is in a normal-rotation operating state or a reverse-rotation operating state can be easily recognized, for example, from a signal from a sensor that detects the operational position of a control lever manually operated for moving the volume varying member 150.

In addition to providing the effect of the first embodiment, the HST 102A according to this embodiment having the above configuration is capable of increasing the axial load applied to the movable body in accordance with the increase of load exerted on the hydraulic motor 140 and, thereby, a favorable power transmission state of the MTD mechanism 200 can be achieved.

That is to say, for example, when the HST 102A is used for the driveline of a utility vehicle such as a riding lawn mower, the oil pressure of a high-pressure line, which is either the first or second hydraulic oil line 20(1), 20(2), increases in accordance with the traveling load exerted on the drive wheels of the utility vehicle.

Thus, by supplying pressurized oil present in the high-pressure hydraulic oil line, which is either the first or second hydraulic oil line 20(1), 20(2), to the oil chamber 260, the oil pressure of the oil chamber 260 can be increased or decreased in accordance with the load exerted on the hydraulic motor 140 and, thereby, the movable body can be pushed in the first axial direction by a suitable amount of axial load.

Figure 5:
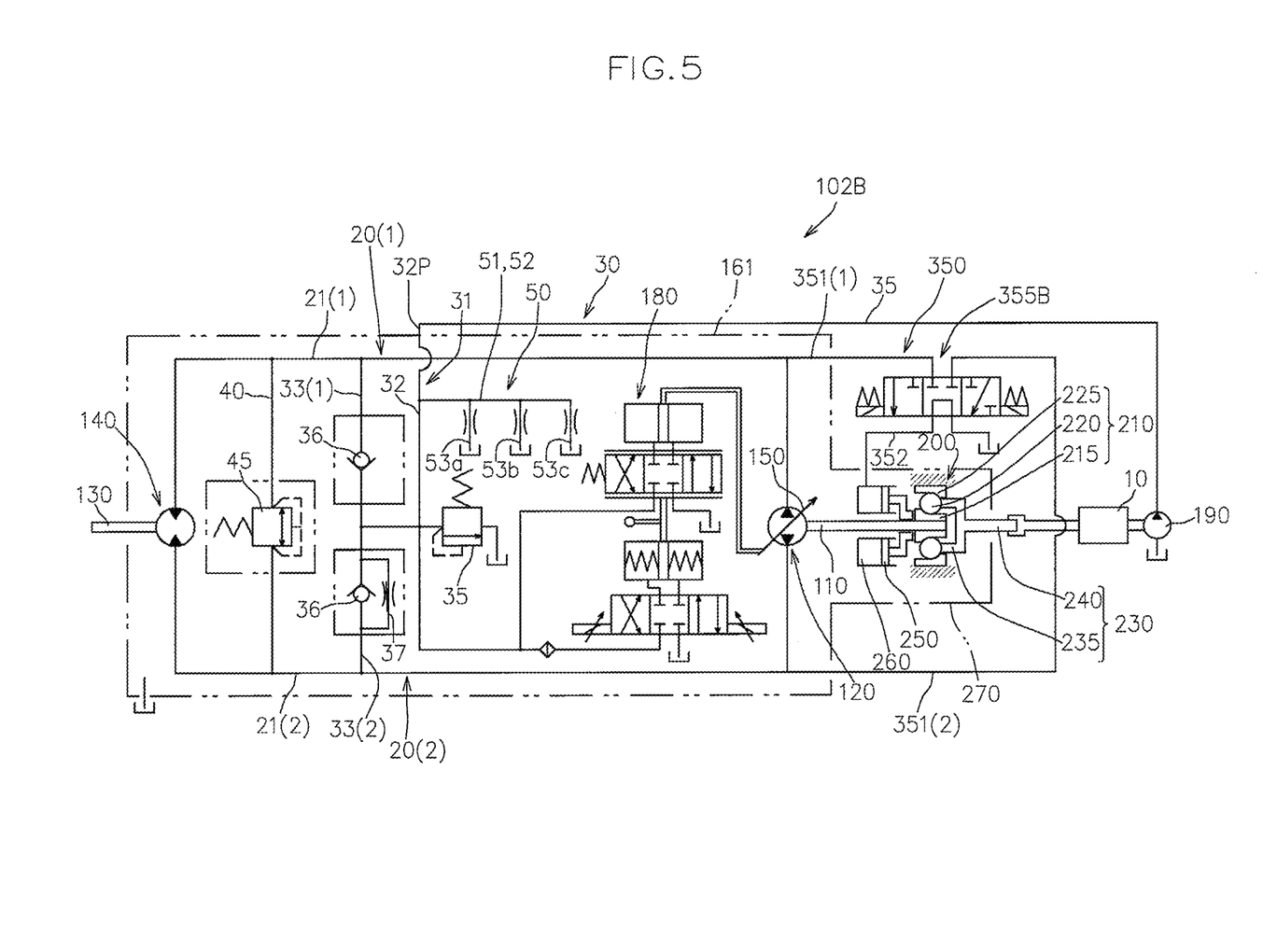
FIG. 5 is a hydraulic circuit diagram of an HST according to a modification of the second embodiment.

Preferably, the switching valve 355 can be replaced with a switching valve 355B that can reach, in addition to the normal-rotation position and the reverse-rotation position, a neutral position where the first and second preload lines 351(1), 351(2) are both disconnected from the oil-chamber-side preload line 352.

FIG. 5 shows a hydraulic circuit diagram of a modification 102B including the switching valve 355B.

In the second embodiment, the controller is configured to control the operation of the switching valve 355B such that the switching valve 355B is placed in the normal-rotation position when the volume varying member 150 is in the normal-rotation operating state, placed in the reverse-rotation position when the volume varying member 150 is in the reverse-rotation operating state, and placed in the neutral position when the volume varying member 150 is in the neutral state.

In addition to providing the effect of this embodiment, the modification 102B having the above configuration enables the MTD mechanism 200 to also act as a clutch member.

In the second embodiment, when the switching valve 355B is placed in the neutral position, a supply of pressurized oil to the oil chamber 260 is interrupted.

Accordingly, no axial load is applied to the movable body, and the MTD mechanism 200 arrives at a clutch disengaged state in which power transmission between the retainer 230 and the inner ring 215 is interrupted.

The modification 102B is particularly advantageous in such a mode of use where the output of a driving member is suspended when the volume varying member 150 is brought into a neutral state, such as a mode of use where the HST 102B is used for the driveline mechanism of a utility vehicle, and when the HST 102B is in neutral, the travel of the utility vehicle is suspended.

In the second embodiment, the volume varying member 150 is configured to reach a normal-rotation operating state and a reverse-rotation operating state, but it is also possible to configure the volume varying member 150 to reach only a normal-rotation operating state and a neutral state.

In the second embodiment, the preload line 350 fluidly connects the oil chamber 260 and a hydraulic oil line (e.g., the first hydraulic oil line 20(1)) that has a high pressure when the hydraulic motor 140 performs normal rotation, and a switching valve that can reach a normal-rotation position where the preload line 350 is in a communicating state and a neutral position where the preload line is in an interrupted state is disposed in the preload line 350.

The operation of the switching valve is controlled such that the switching valve reaches a normal-rotation position and a neutral position when the volume varying member is in a normal-rotation operating state and a neutral state, respectively.

Third Embodiment

Below, yet another embodiment of the HST according to the present disclosure will now be described with reference to attached drawings.

Figure 6:
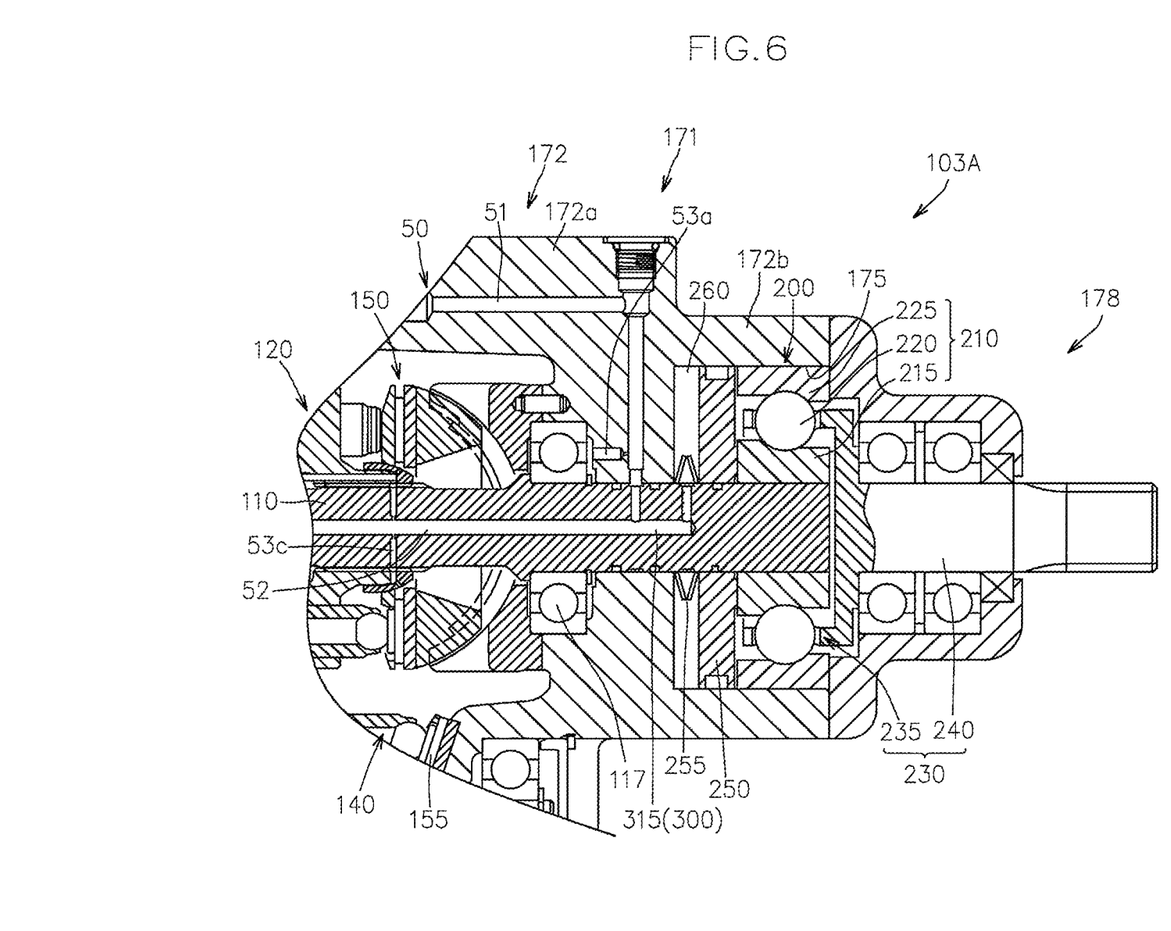
FIG. 6 is a partial cross-sectional view of an HST according to a third embodiment.

FIG. 6 shows a partial cross-sectional view of an HST 103A according to the third embodiment.

In the drawing, the same components as those in the first and second embodiments are given the same reference numbers, and descriptions thereof are omitted as appropriate.

In the third embodiment, the HST 103A is different from the HST 101A of the first embodiment in that an HST case 171 and a lid member 178 removably attached to the HST case 171 form a receptacle for the MTD mechanism 200.

Specifically, in comparison to the HST 101A according to the first embodiment, the HST 103A according to this embodiment has the HST case 171 in place of the HST case 161, and has the lid member 178 in place of the MTD case 270.

The HST case 171 is different from the HST case 161 in that the HST case body 162 is changed to an HST case body 172.

In the third embodiment, the HST case 171 has the HST case body 172 and the port block 165 that is removably attached to the HST case body 172 so as to block the opening of the HST case body 172.

The HST case body 172 has a peripheral wall 172a and an end wall 172b that blocks one side in the axial direction of the peripheral wall 172a.

The end wall 172b has an accommodating recess 175 opening outward at a portion supporting a shaft which is either the pump shaft 110 or the motor shaft 130 and to which the inner ring 215 is connected (the pump shaft 110 in this embodiment).

The accommodating recess 175 is configured to be capable of accommodating the bearing member 210 such that the outer ring 225 is radially immovable.

With the bearing member 210 that is furnished with the retainer 230 being accommodated in the accommodating recess 175, the lid member 178 is removably attached to the end wall 172b so as to block the accommodating recess 175 while allowing the shaft part 240 of the retainer 230 to extend outward.

In the third embodiment, as shown in FIG. 6, the inner ring 215 is a movable body that is movable outward, i.e., in the first axial direction, and the outer ring 225 is made immovable in the first axial direction by the lid member 178.

The piston 250 is accommodated in the accommodating recess 175 so as to be axially movable in a place more toward the inside than the bearing member 210 in the axial direction, and the oil chamber 260 is formed on the inner side of the piston 250 in the axial direction.

The HST 103A having the above configuration can also provide the same effect as the effect of the first embodiment.

In the third embodiment, as shown in FIG. 6, the hydraulic line 300 has an oil passage 315 that is formed in the pump shaft 110 such that one end is fluidly connected to the pump-shaft-side drawing oil passage 52 and the other end opens to the oil chamber 260.

Although, in the third embodiment, in a state where the bearing member 210 is accommodated in the accommodating recess 175 provided in the end wall 172b, the inner ring 215 is a movable body that is movable in an axially outward direction, i.e., the first axial direction, and the outer ring 225 is a fixed body that is immovable in the first axial direction, it is also possible to modify the configuration such that the inner ring 215 becomes the fixed body, and the outer ring 225 becomes the movable body.

Figure 7:
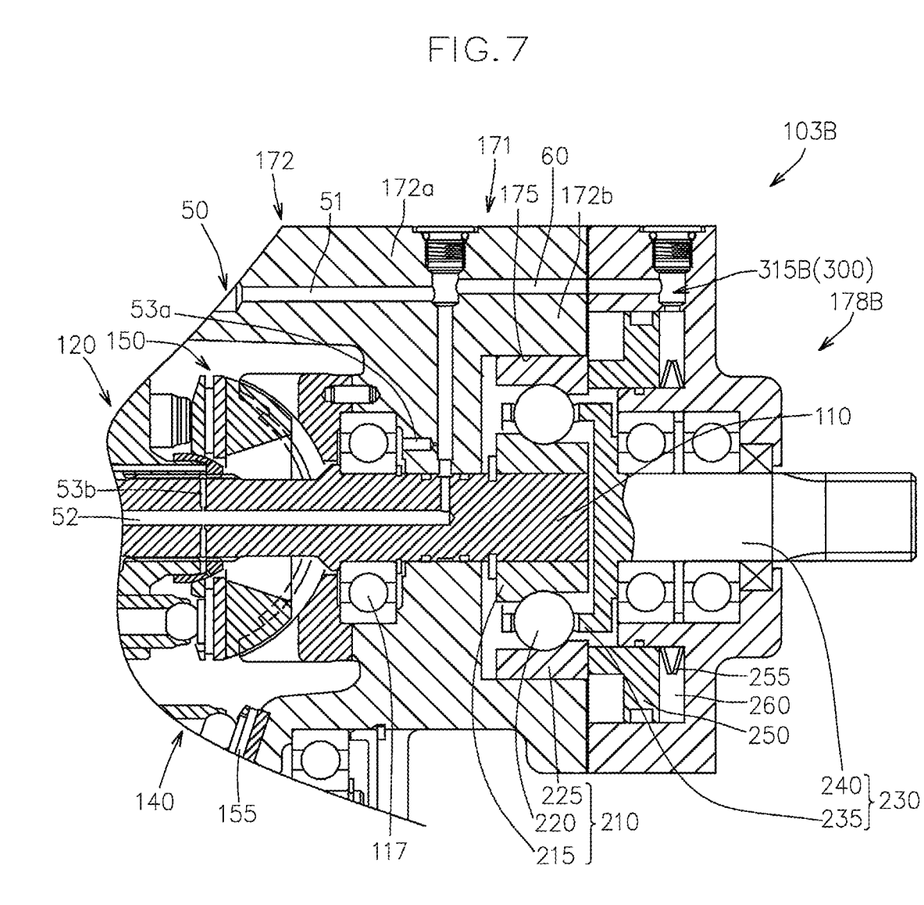
FIG. 7 is a partial cross-sectional view of an HST according to a modification of an embodiment.

FIG. 7 shows a partial cross-sectional view of a modification 103B.

As shown in FIG. 7, in the modification 103B, the outer ring 225 is accommodated in the accommodating recess 175 so as to be movable in the axially inward direction, and for the outer ring 225, the axially inward direction is the first axial direction where a radial load is exerted on the rolling elements 220.

On the other hand, the inner ring 215 is made immovable in the axially inward direction by a retaining ring.

The modification 103B includes a lid member 178B in place of the lid member 178.

With the bearing member 210 that is furnished with the retainer 230 being accommodated in the accommodating recess 175, the lid member 178B is removably attached to the end wall 172b so as to block the accommodating recess 175 while allowing the shaft part 240 of the retainer 230 to extend outward.

Moreover, the lid member 178B is formed so as to accommodate the piston 250 such that the piston 250 can push the outer ring 225 in the first axial direction (the axially inward direction), and define the oil chamber 260 on the axially opposite side of the piston 250 from the outer ring 225.

In the modification 103B, the preload line 300 has an oil passage 315B that is formed in the lid member 178B such that one end opens to the contact surface in contact with the end wall 172b and the other end opens to the oil chamber 260, and said one end of the hydraulic oil passage 315B is fluidly connected to the drawing oil passage 50 via the intermediate oil passage 60.

Fourth Embodiment

Below, yet another embodiment of the HST according to the present disclosure will now be described with reference to the attached drawings.

Figure 8:
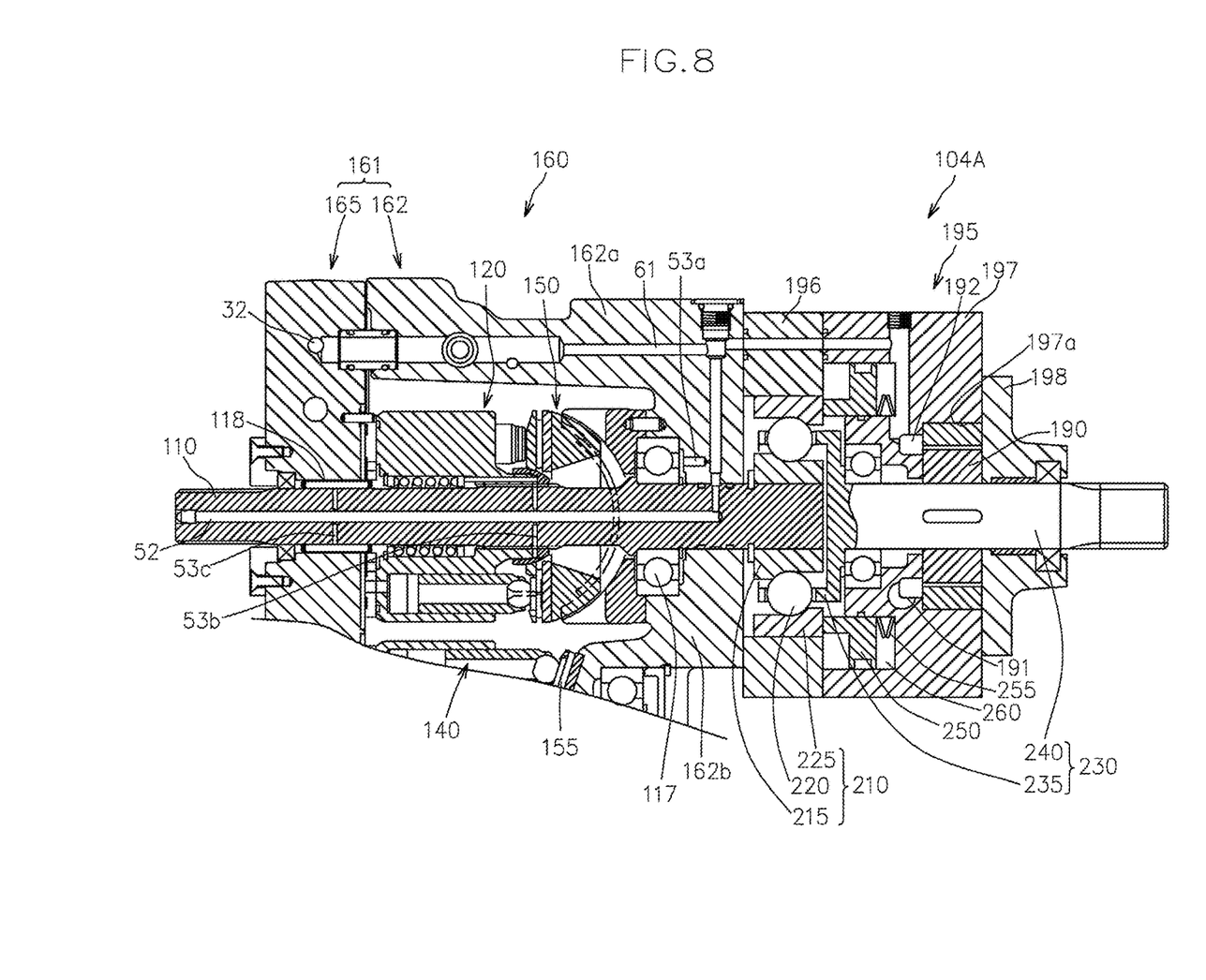
FIG. 8 is a partial cross-sectional view of an HST according to a fourth embodiment.

FIG. 8 shows a partial cross-sectional view of an HST 104A according to this embodiment.

In the drawing, the same components as those in the first to third embodiments are given the same reference numbers, and descriptions thereof are omitted as appropriate.

As shown in FIG. 8, the HST 104A according to this embodiment is different from the HST 100A according to the first embodiment in that the charge pump 190 is included in an integral manner and that the MTD mechanism 200 is accommodated in a charge pump case 195 that accommodates the charge pump 190.

Specifically, the charge pump case 195 has a first case 196 that is connected to the end wall 162b of the HST case body 162 so as to surround the bearing member 210 in which the inner ring 215 is supported by the pump shaft 110, a second case 197 that is connected to the first case 196 while allowing the shaft part 240 of the retainer 230 attached to the bearing member 210 to extend outward, and a lid member 198 that is connected to the second case 197.

In the fourth embodiment, the outer ring 225 is a movable body that is movable in the axially inward direction, and the inner ring 215 is a fixed body that is made immovable in the axially inward direction by a retaining ring.

The second case 197 is formed so as to accommodate the piston 250 such that the piston 250 can push the outer ring 225 in the axially inward direction, and define the oil chamber 260 on the axially opposite side of the piston 250 from the outer ring 225.

In the fourth embodiment, as shown in FIG. 8, the charge pump 190 is supported by the shaft part 240 of the retainer 230, and the second case 197 has a charge pump receptacle 197a that surrounds the charge pump 190 supported by the shaft part 240, a charge suction oil passage 191 that is fluidly connected to the suction side of the charge pump 190, and a charge discharge oil passage 192 that is fluidly connected to the discharge side of the charge pump 190.

The charge discharge oil passage 192 is fluidly connected to the oil chamber 260 and, in addition, fluidly connected to the main charge oil passage 32 formed in the port block 165 via an intermediate oil passage 61 formed in the first case 196, the second case 197, and the HST case body 162.

The lid member 198 is connected to the second case 197 so as to block the charge pump receptacle 197a in a fluid-tight manner while allowing the shaft part 240 of the retainer 230 to extend outward.

In addition to providing the same effect as the effect of the HST 101A of the first embodiment, the HST 104A having the above configuration can provide a simple charge oil supplying structure.

Fifth Embodiment

Below, yet another embodiment of the HST according to the present disclosure will now be described with reference to the attached drawings.

Figure 9:
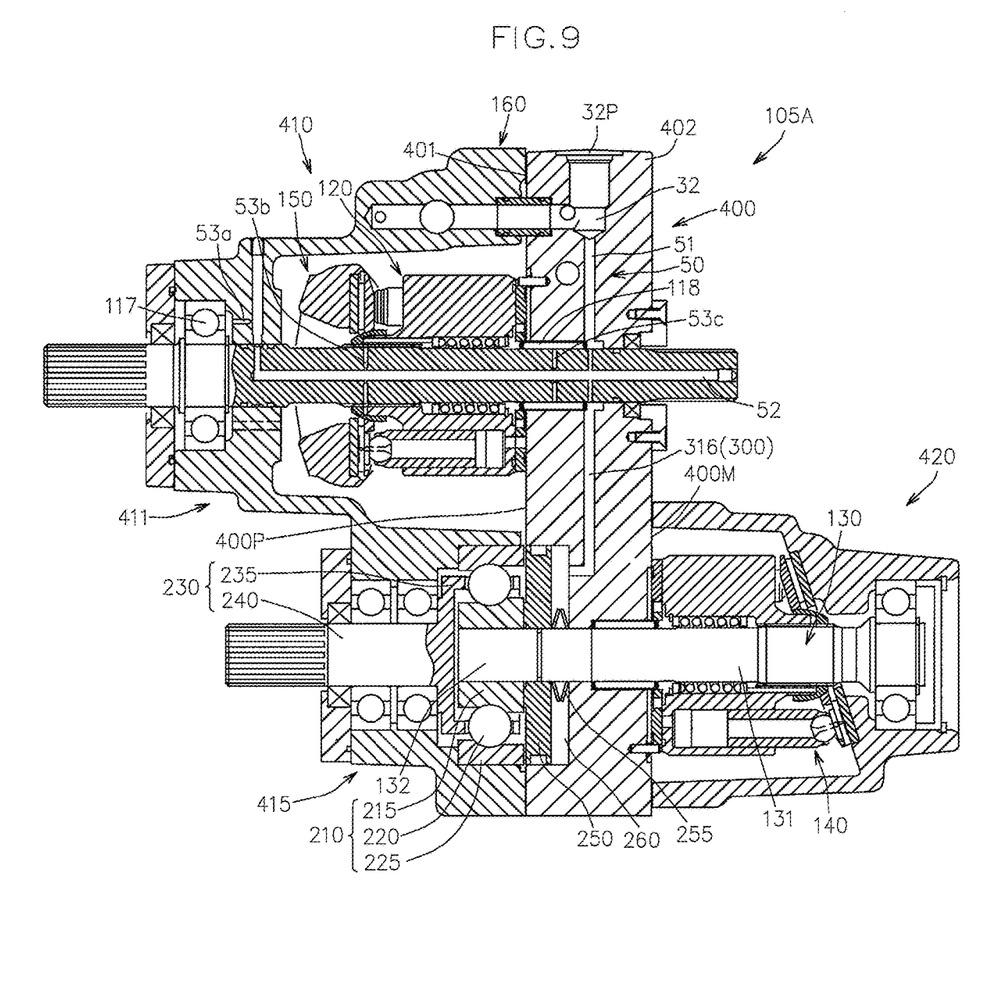
FIG. 9 is a partial cross-sectional view of an HST according to a fifth embodiment.

FIG. 9 shows a partial cross-sectional view of an HST 105A according to this embodiment.

In the drawing, the same components as those in the first to fourth embodiments are given the same reference numbers, and descriptions thereof are omitted as appropriate.

The HST 105A according to this embodiment is configured such that the hydraulic pump 120 and the hydraulic motor 140 are attached to an end face on one side and an end face on the other side of a port block 400, respectively.

Specifically, the HST 105A, as the case 160 accommodating the hydraulic pump 120 and the hydraulic motor 140, has a port block 400 that has a pump attachment region 400P on a first end face 401 on one side and a motor attachment surface 400M on a second end face 402 on the other side, a pump case 410 that is removably attached to the first end face 401 so as to surround the hydraulic pump 120 attached to the pump attachment surface 400P, and a motor case 420 that is removably attached to the second end face 402 so as to surround the hydraulic motor 140 attached to the motor attachment surface 400M.

In the fifth embodiment, the MTD mechanism 200 is provided as a deceleration mechanism connected to the motor shaft 130, and the pump case 410 and the port block 400 form a receptacle that accommodates the MTD mechanism 200.

Specifically, as shown in FIG. 9, the motor shaft 130 has a motor supporting part 131 that extends outward from the second end face 402 of the port block 400 so as to support the hydraulic motor 140, and an output part 132 that extends outward from the first end face 401 of the port block 400.

The pump case 410 has a pump receptacle 411 that surrounds the hydraulic pump 120, and an extension 415 that extends from the pump receptacle 411 so as to surround the output part 132 of the motor shaft 130.

In the fifth embodiment, the extension 415 and the port block 400 form the receptacle that accommodates the MTD mechanism 200.

Specifically, by being joined to each other, the extension 415 and the port block 400 are configured to form a space that accommodates the bearing member 210 and the piston 250 and defines the oil chamber 260.

In the fifth embodiment, the extension 415 has a first recess 450(1) that opens toward the port block 400, the first end face 401 of the port block 400 has a second recess 450(2) that opens toward the extension 415, and the first and second recesses 450(1), 450(2) form the aforementioned space.

The first recess 450(1) is formed so as to accommodate the outer ring 225 in a radially immovable manner.

In the fifth embodiment, the inner ring 215 is a movable body that is movable in the first axial direction (the direction away from the hydraulic motor 140 in this embodiment), and the outer ring 225 is a fixed body.

Accordingly, the first recess 450(1) is formed so as to prevent the movement of the outer ring 225 in the first axial direction.

Moreover, the extension 415 supports the retainer 230 in a rotatable manner around the axis while allowing the shaft part 240 of the retainer 230 attached to the bearing member 210 to extend outward.

The second recess 450(2) is formed so as to accommodate the piston 250 such that the piston 250 can push the inner ring 215 serving as a movable body in the first axial direction, and define the oil chamber 260 on the axially opposite side of the piston 250 from the inner ring 215.

In the fifth embodiment, the preload line 300 has an oil passage 316 that is formed in the port block 400 such that one end is fluidly connected to the rotary joint and the other end opens to the oil chamber 260.

The above embodiments have been described in reference to a case where the present disclosure is applied to an HST in which the hydraulic pump 120 and hydraulic motor 140 are provided in an integral manner, but the present disclosure is not limited to such embodiments.

That is to say, the present disclosure is applicable to hydraulic devices such as an independently installable hydraulic pump device that has a pump shaft operatively rotated/driven by a driving source, a hydraulic pump supported by the pump shaft, and a pump case accommodating the hydraulic pump, and an independently installable hydraulic motor device that has a motor shaft, a hydraulic motor supported by the motor shaft, and a motor case accommodating the hydraulic motor.

Specifically, the hydraulic device of the present disclosure includes rotational shafts such as a pump shaft and a motor shaft, rotating components such as a hydraulic pump and a hydraulic motor supported by the rotational shafts, an independently installable case accommodating the rotating components, and the aforementioned MTD mechanism.

In the fifth embodiment, the inner ring of the MTD mechanism is supported by the rotational shaft in a relatively non-rotatable manner, the outer ring is accommodated in the case in a radially immovable manner, and the shaft part of the retainer attached to the bearing member extends outward from the case.

Moreover, the case has a piston that is axially movable so as to be capable of pushing in the first axial direction a component, which is either the inner ring or the outer ring and acts as a movable body, an oil chamber provided on the opposite side of the piston from the movable body, and an oil passage that forms at least a part of the preload line for supplying pressurized oil to the oil chamber.

The invention claimed is:

1. A hydrostatic transmission, comprising:
a pump shaft operatively connected to a driving source;
a motor shaft acting as an output shaft;
a hydraulic pump and a hydraulic motor that are supported by the pump shaft and the motor shaft, respectively, and are fluidly connected to each other;
a case wherein the hydraulic pump and the hydraulic motor are disposed therein, and a volume varying member varying a volume of at least one of the hydraulic pump and the hydraulic motor; and
a bearing member that has an inner ring, a plurality of rolling elements, and an outer ring and is capable of bearing a radial load and a unidirectional axial load, and a retainer that has a retaining part retaining the rolling elements such that the rolling elements are rotatable around their own axes and rotates around an axis of the inner ring in accordance with an orbital motion of the rolling elements around the inner ring,
wherein the bearing member is disposed in the case such that, with the inner ring being connected to one of the pump shaft and the motor shaft so as to be relatively non-rotatable and the outer ring being radially immovable, one of the inner ring and the outer ring is a movable body that is movable in a first axial direction to exert a radial load on the rolling elements, and the other is a fixed body that is immovable in the first axial direction,
wherein the case has a piston that is axially movable so as to be capable of pushing the movable body in the first axial direction, an oil chamber provided on an opposite side of the piston from the movable body, and an oil passage that forms at least a part of a preload line for supplying some of pressurized oil present in the hydrostatic transmission to the oil chamber,
wherein the hydraulic pump and the hydraulic motor are fluidly connected to each other by a pair of first and second hydraulic oil lines so as to form a closed circuit,
wherein the volume varying member is configured to be capable of reaching a normal-rotation operating state in which supply and discharge directions of the hydraulic pump are determined such that the first and second hydraulic oil lines have a high pressure and a low pressure, respectively, so as to cause the hydraulic motor to perform normal rotation, and a reverse-rotation operating state in which supply and discharge directions of the hydraulic pump are determined such that the first and second hydraulic oil lines have a low pressure and a high pressure, respectively, so as to cause the hydraulic motor to perform reverse rotation,
wherein the preload line includes first and second preload lines fluidly connected to the first and second hydraulic oil lines, respectively, an oil-chamber-side preload line fluidly connected to the oil chamber, and a switching valve interposed between the oil-chamber-side preload line and the first and second preload lines, and
wherein the switching valve is capable of reaching a normal-rotation position where the first preload line is connected to the oil-chamber-side preload line and the second preload line is disconnected from the oil-chamber-side preload line, and a reverse-rotation position where the first preload line is disconnected from the oil-chamber-side preload line and the second preload line is connected to the oil-chamber-side pre-load line, and the switching valve reaches the normal-rotation position and the reverse-rotation position when the volume varying member is in the normal-rotation operating state and the reverse-rotation operating state, respectively.

2. The hydrostatic transmission according to claim 1, wherein the switching valve is capable of reaching, in addition to the normal-rotation position and the reverse-rotation position, a neutral position where the first and second preload lines are both disconnected from the oil-chamber-side preload line, and the switching valve reaches the neutral position when the volume varying member is in a neutral state between the normal-rotation operating state and the reverse-rotation operating state.

3. The hydrostatic transmission according to claim 1, wherein an auxiliary spring that biases the piston in the first axial direction is provided in the oil chamber.

4. A hydrostatic transmission comprising:
a pump shaft operatively connected to a driving source;
a motor shaft acting as an output shaft;
a hydraulic pump and a hydraulic motor that are supported by the pump shaft and the motor shaft, respectively, and are fluidly connected to each other;
a case wherein the hydraulic pump and the hydraulic motor are disposed therein, and a volume varying member varying a volume of at least one of the hydraulic pump and the hydraulic motor; and
a bearing member that has an inner ring, a plurality of rolling elements, and an outer ring and is capable of bearing a radial load and a unidirectional axial load, and a retainer that has a retaining part retaining the rolling elements such that the rolling elements are rotatable around their own axes and rotates around an axis of the inner ring in accordance with an orbital motion of the rolling elements around the inner ring,
wherein the bearing member is disposed in the case such that, with the inner ring being connected to one of the pump shaft and the motor shaft so as to be relatively non-rotatable and the outer ring being radially immovable, one of the inner ring and the outer ring is a movable body that is movable in a first axial direction to exert a radial load on the rolling elements, and the other is a fixed body that is immovable in the first axial direction,
wherein the case has a piston that is axially movable so as to be capable of pushing the movable body in the first axial direction, an oil chamber provided on an opposite side of the piston from the movable body, and an oil passage that forms at least a part of a preload line for supplying some of pressurized oil present in the hydrostatic transmission to the oil chamber,
wherein the hydraulic pump and the hydraulic motor are fluidly connected to each other by a pair of first and second hydraulic oil lines so as to form a closed circuit,
wherein the volume varying member is configured to be capable of reaching a normal-rotation operating state in which supply and discharge directions of the hydraulic pump are determined such that the first hydraulic oil line has a high pressure so as to cause the hydraulic motor to perform normal rotation, and a neutral state in which supply and discharge of the hydraulic pump are suspended,
wherein the preload line has one end that is fluidly connected to the first hydraulic oil line and the other end that is fluidly connected to the oil chamber,
wherein a switching valve is disposed in the preload line, and
wherein the switching valve is capable of reaching a normal-rotation position where the preload line is in a communicating state, and a neutral position where the preload line is in an interrupted state, and the switching valve reaches the normal-rotation position and the neutral position when the volume varying member is in a normal-rotation operating state and a neutral state, respectively.

5. The hydrostatic transmission according to claim 4, wherein an auxiliary spring that biases the piston in the first axial direction is provided in the oil chamber.

* * * * *